United States Patent
Dawson et al.

(10) Patent No.: US 7,333,323 B1
(45) Date of Patent: Feb. 19, 2008

(54) DISPLAY SYSTEM FOR USE WITH PORTABLE DISPLAY DEVICE

(75) Inventors: Christopher James Dawson, Arlington, VA (US); Barry Michael Graham, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/461,488

(22) Filed: Aug. 1, 2006

(51) Int. Cl.
*G06F 1/16* (2006.01)
(52) U.S. Cl. .................. 361/681; 361/682; 248/917
(58) Field of Classification Search ............. 361/681, 361/680, 682; 248/921, 922, 917
See application file for complete search history.

(56) References Cited

U.S. PATENT DOCUMENTS

| | | | |
|---|---|---|---|
| 5,991,150 A * | 11/1999 | Chiu et al. ............... | 361/681 |
| 6,341,061 B1 | 1/2002 | Eisbach et al. .......... | 361/687 |
| 6,532,147 B1 * | 3/2003 | Christ, Jr. ................ | 361/683 |
| 6,771,493 B2 | 8/2004 | Chen ....................... | 361/680 |
| 6,778,196 B2 | 8/2004 | Nakamura ............... | 345/905 |
| 6,826,043 B2 * | 11/2004 | Chang ..................... | 361/683 |
| 6,836,404 B2 * | 12/2004 | Duarte ..................... | 361/680 |
| 7,065,835 B2 * | 6/2006 | Kuramochi ............... | 16/357 |
| 7,107,084 B2 * | 9/2006 | Duarte et al. ............ | 455/575.3 |
| 7,158,634 B2 * | 1/2007 | Eromaki .................. | 379/433.13 |
| 2004/0091101 A1 | 5/2004 | Park et al. ............... | 379/428.01 |
| 2004/0212968 A1 | 10/2004 | Lin ........................... | 361/755 |
| 2005/0152102 A1 * | 7/2005 | Shin ......................... | 361/681 |
| 2006/0039104 A1 * | 2/2006 | Wang et al. .............. | 361/681 |

* cited by examiner

*Primary Examiner*—Jayprakash Gandhi
*Assistant Examiner*—Ingrid Wright
(74) *Attorney, Agent, or Firm*—David A. Mims, Jr.; Robert V. Wilder

(57) ABSTRACT

A method and system are provided in which a display screen of an electronic device such as a laptop computer is double-hinged to a base or keyboard unit in such a manner as to allow the display screen to be opened while the bottom portion of the display screen is free to rotate toward a user to enable the user to view the display screen when little or no space is available at the rear of the display screen. A double-hinged arrangement including an extendable coupling is provided at the sides of the laptop such that there is access to the keyboard when the display screen is rotated upwardly and the bottom of the display screen is moved toward the user.

10 Claims, 3 Drawing Sheets

DISPLAY SYSTEM FOR USE WITH PORTABLE DISPLAY DEVICE

FIELD OF THE INVENTION

The present invention relates generally to display panel mountings and more particularly to a system and methodology for mounting a selectively movable display screen to a base section of an electronic device.

BACKGROUND OF THE INVENTION

As a result of the development of small portable computer devices, almost everyone has come to use and rely upon some type of electronic device such as a "laptop" personal computer (PC). Laptop computers and other electronic devices have become so versatile that they are used for many different applications, both business and personal. For example, a laptop computer may be used simply as a word processor or as a movie screen able to play video files from a CD.

Laptop computers generally include a keyboard unit and a display unit which are hinged together by a single fixed hinging system which couples the bottom of the display unit and the top of the keyboard unit. The display unit is selectively rotated to an open position to enable a user to work on the keyboard and view the user input on the display screen. Other electronic devices, such as CD players, may not require a full keyboard but operate in the same manner by rotating a display screen to an open position in order to view a video file presentation.

In many situations however, there is little if any space behind a laptop to allow the display panel to fully open. For example, in an airplane seat, the seat directly in front of a laptop user is reclined at an angle to make it extremely difficult if not impossible to fully open the display screen of a laptop computer or other display device such as a CD player. If the laptop is moved closer to the user so that the screen can be partially viewed, the keyboard portion of the laptop is so close to the user that it is practically impossible to efficiently work on the keyboard.

Thus, there is a need for an improved system and methodology for enabling a user to open a display screen of an electronic device in a confined space and to comfortably work the keyboard while, at the same time, having a full view of the display screen.

SUMMARY OF THE INVENTION

A method and system are provided in which a display screen of an electronic device such as a laptop computer is double-hinged to a base or keyboard unit in such a manner as to allow the display screen to be opened while the bottom portion of the display screen is free to rotate toward a user to enable the user to view the display screen when little or no space is available at the rear of the display screen. In an exemplary embodiment, a double-hinged arrangement is provided at the sides of the laptop such that there is access to the keyboard when the display screen is rotated upwardly and the bottom of the display screen is moved toward the user. In an exemplary embodiment, a first hinged sidebar couples the lower portion of the display screen with the lower portion of the keyboard unit and a second hinged sidebar couples the upper portion of the display screen with the upper portion of the keyboard unit. The hinged sidebars are positioned at the sides of the laptop to allow access to the keyboard unit when the laptop is fully opened. The first hinged sidebar is a telescoping sidebar which may be compressed and extended to position the display screen at a comfortable viewing angle relative to the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
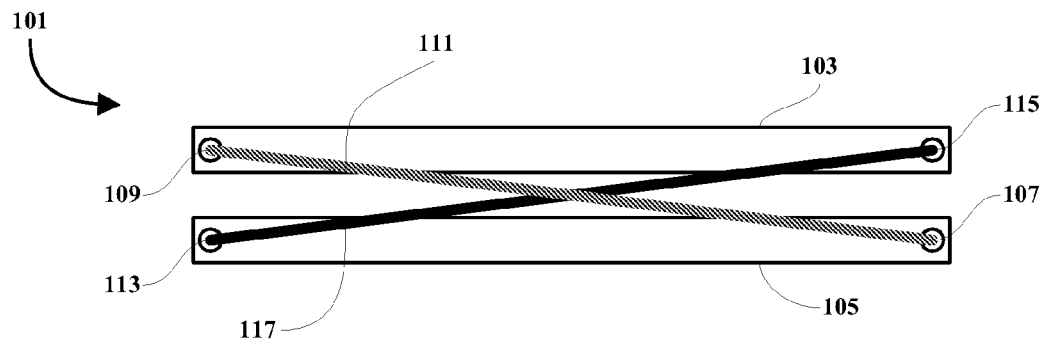
FIG. 1 is a side view of a laptop computer illustrating the hinged sidebar arrangement of the present invention.

It is noted that devices which are shown in block or schematic form in the drawings are generally known to those skilled in the art, and are not specified to any greater extent than that considered necessary as illustrated, for the understanding and appreciation of the underlying concepts of the present invention and in order not to obfuscate or distract from the teachings of the present invention. Also, throughout the drawings, like numerals refer to the same parts. While the illustrated example refers to a laptop computer, it is understood that the principles disclosed herein apply equally as well to any electronic device which includes a display screen designed to be rotated around a fixed base axis to an open position.

In FIG. 1, a laptop computer 101 is illustrated. The laptop 101 includes a display screen 103 and a keyboard 105. The bottom 107 of the keyboard 105 is hinged through a first hinged variable-length sidebar 111 to the bottom 109 of the display screen 103. The bottom 109 of the display screen 103 is hinged through a second fixed-length sidebar 117 to the bottom 107 of the keyboard 105. The variable-length sidebar 111 includes a telescoping design and can be extended or compressed by a user to move the bottom 109 of the display screen 103 relative to the bottom 107 of the keyboard 105 as is later described in connection with FIG. 5. The double-hinged arrangement shown in FIG. 1 is implemented on both sides of the laptop computer for stability. The hinges securing the sidebars to the display screen and the keyboard may be any of many well known designs to enable a rotating movement as illustrated. As shown in FIG. 1, the laptop may be opened and closed in a normal manner by simply rotating the display screen 103 upwardly without compressing the variable-length sidebar 111. However, when there is little or no space available behind the laptop, the double-hinged design and the variable-length hinged sidebar 111 may be used to allow a full view of the display screen 103 while also allowing use of the keyboard 105.

Figure 2:
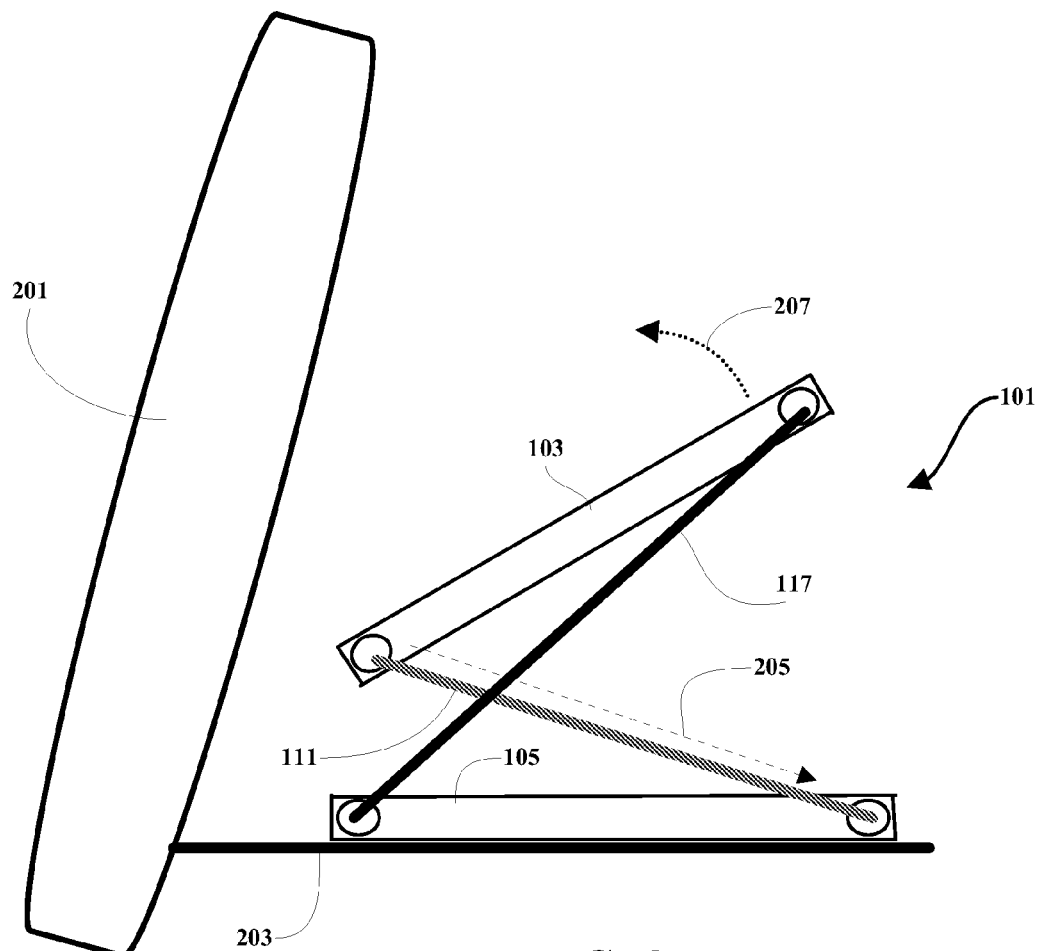
FIG. 2 is an illustration showing a laptop computer in a partially open position on a tray table of a reclining front seat.

As shown in FIG. 2, when the laptop computer 101 is placed on a tray table 203 of a reclined seat 201 in front of a user, such as frequently happens in an airplane, it is difficult to fully open the laptop computer or any other device which includes a single-hinged, rotate-to-open display screen. However, with the illustrated double-hinged arrangement, a display screen may be opened to a position where the entire screen may be viewed. As illustrated, as the display screen 103 is rotated open 207, a user may force the variable-length sidebar 111 to compress 205 to allow the bottom of the display screen to be moved toward the bottom of the keyboard 105 of the laptop computer 101 while the fixed-length sidebar 117 guides the rotation 207 of the top of the display screen 103.

Figure 3:
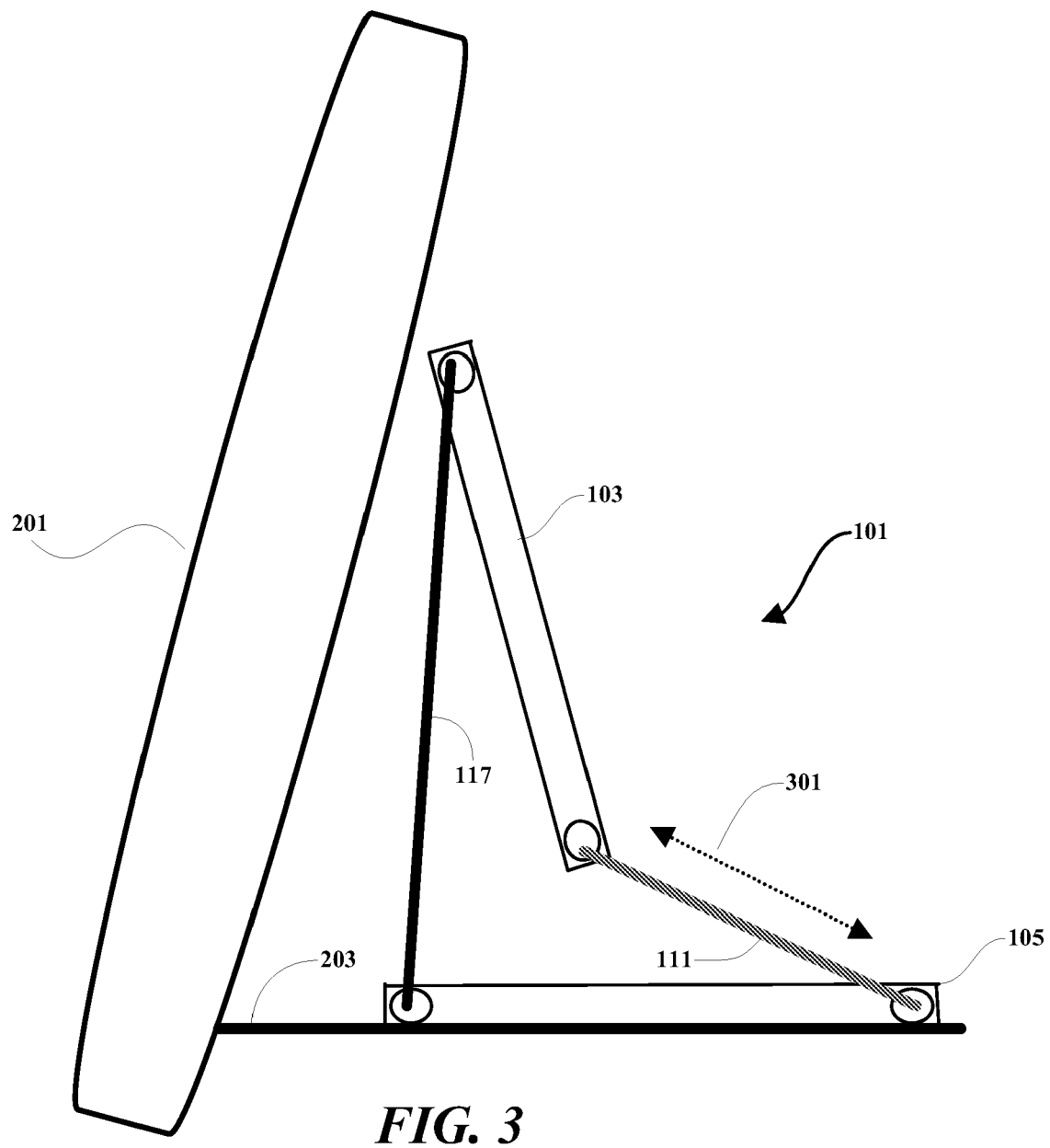
FIG. 3 is an illustration showing a laptop computer in a fully open position on a tray table of a reclining front seat.

FIG. 3 illustrates the open position of the laptop computer shown in FIG. 2. In FIG. 3, the variable-length sidebar 111 has been compressed 301 to a point such that the display screen 103 is positioned above the keyboard 105 and disposed at an angle to allow a user full view of the display. Since the display is above the keyboard and the sidebars are along the sides of the laptop, a user may place his or her hands inside of the sidebars 111 to access and work on the keyboard 105.

Figure 4:
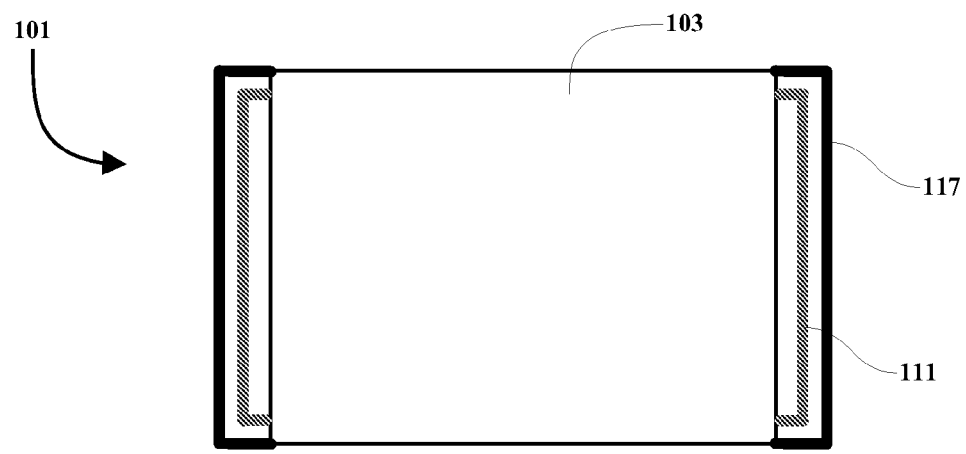
FIG. 4 is a top view of a laptop computer showing the double hinged sidebars on each side of the computer.

FIG. 4 shows a top view of a laptop 101 in a closed position, including the display unit 103 with the variable length sidebars 111 and fixed-length sidebars 117 positioned along side of the laptop computer 101.

Figure 5:
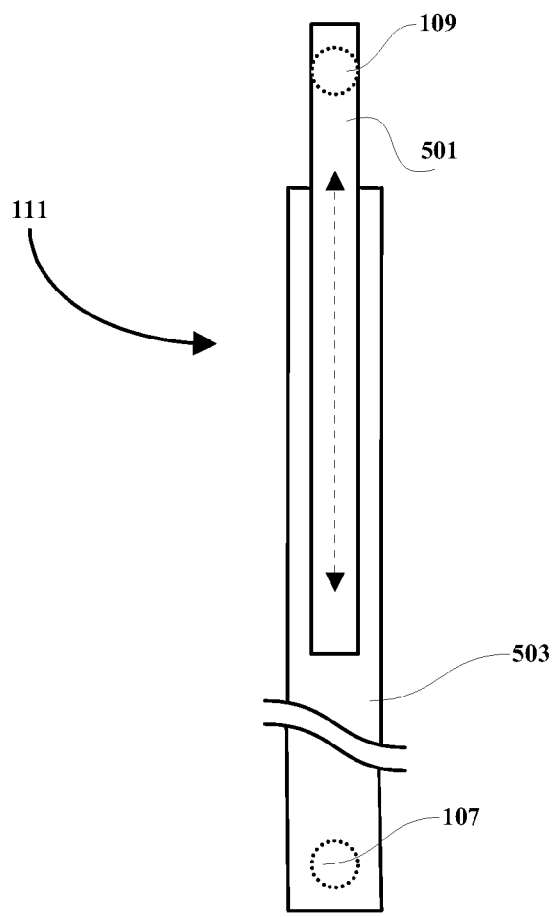
FIG. 5 is an illustration showing an exemplary embodiment of a hinged telescoping sidebar which may be implemented in an exemplary usage of the present invention.

FIG. 5 illustrates an exemplary embodiment of a variable-length or telescoping sidebar 111. As shown, a first bar element 501 is slideably engaged within a second bar element 503. The first bar element includes a first hinge component 109 arranged for engagement with a corresponding hinge at the bottom of the display screen and the second bar element 503 includes a second hinge component 107 arranged for engagement with a corresponding hinge at the bottom of the keyboard as described in connection with FIG. 1. In the example, element 501 is designed to slide within element 503 with moderate force which might correspond to, for example, sliding or extending an antenna of a car radio. The frictional pressure between the first and second bar elements 501 and 503 is such as to allow movement of element 501 relative to element 503 but for bar element 501 to retain its position relative to bar element 503 when no user force is applied. Other arrangements to accomplish this slidable telescoping function may also be implemented.

The method and apparatus of the present invention has been described in connection with a preferred embodiment as disclosed herein. The disclosed methodology may be implemented in a wide range of designs and embodiments to accomplish the desired results as herein illustrated. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A display system comprising:
   a base unit;
   a display screen; and
   a variable length coupling device coupling said base unit to said display screen, said variable length coupling device being configured to extend and contract thereby enabling a user to selectively vary a distance between said base unit and said display device, said variable length coupling device comprising a first element coupled to said display screen and a second element coupled to said base unit, said first element being arranged to selectively move in a linear relationship relative to said second element thereby enabling a movement of said display screen coupled to said first element relative to said base unit coupled to said second element, said variable length coupling device being arranged to couple a bottom portion of said base unit to a bottom portion of said display screen, said display system further including a fixed length coupling device for coupling a top portion of said base unit with a top portion of said display screen.

2. A display system comprising:
   a base unit;
   a display screen; and
   a variable length coupling device coupling said base unit to said display screen, said variable length coupling device being configured to extend and contract along a common line thereby enabling a user to selectively vary a distance between said base unit and said display device, wherein said display system comprises a portable computer, said base unit comprising a keyboard device of said portable computer, wherein said variable length coupling device is arranged to couple a bottom portion of said keyboard device with a bottom portion of said display screen, said display system further including a fixed length coupling device for coupling a top portion of said keyboard device with a top portion of said display screen.

3. The display system as set forth in claim 2 wherein said variable length coupling device and said fixed length coupling device are arranged along both sides of said portable computer thereby avoiding obstructing access to said keyboard device when said portable computer is in an open position.

4. A display system comprising:
   a base unit;
   a display screen;
   a first hinging device arranged for hinging a bottom portion of said base unit to a bottom portion of said display screen; and
   a second hinging devices arranged for hinging a top portion of said base unit to a top portion of said display screen, said first hinging device comprising first and second hinging elements configured to extend and contract in a telescoping manner along a common line.

5. The display system as set forth in claim 4 wherein said display system comprises a video player for displaying video presentations on said display screen.

6. The display system as set forth in claim 5 wherein said display system includes a CD video player.

7. The display system as set forth in claim 4 wherein said display system comprises a portable computer, said base unit comprising a keyboard device of said portable computer.

8. The display system as set forth in claim 4 wherein said first hinging device is configured to extend and contract thereby enabling a user to selectively vary a distance between said base unit and said display device.

9. The display system as set forth in claim 8 wherein said second hinging device is a fixed length coupling device coupling a top portion of said display screen to a top portion of said base unit.

10. The display system as set forth in claim 9 wherein said display screen and said base unit are part of a portable computer, said base unit comprising a keyboard device of said portable computer, said display system including a pair of said first and said second hinging devices being arranged along both sides of said portable computer thereby avoiding obstructing access to said keyboard device when said portable computer is in an open position.

* * * * *